June 28, 1955   H. C. KOCH   2,712,125
AUTOMATIC PARKING GARAGE
Filed June 5, 1953   5 Sheets-Sheet 1

Inventor
Harry C Koch

Inventor
Harry C Koch

June 28, 1955

H. C. KOCH 2,712,125

AUTOMATIC PARKING GARAGE

Filed June 5, 1953

Inventor
Harry C. Koch

June 28, 1955  H. C. KOCH  2,712,125
AUTOMATIC PARKING GARAGE
Filed June 5, 1953  5 Sheets-Sheet 4

Inventor
Harry C Koch

Inventor
Harry C. Koch

United States Patent Office 2,712,125
Patented June 28, 1955

2,712,125
AUTOMATIC PARKING GARAGE

Harry C. Koch, Redwood City, Calif.

Application June 5, 1953, Serial No. 359,940

6 Claims. (Cl. 340—51)

This invention relates to means for determining and indicating the charges to be made for the parking of automobiles in parking garages and in parking lots and for collecting such charges and for issuing receipts upon the payment of such charges and for indicating a signal and identifying space number if, and at the time, such space is vacated without payment of the proper charge.

It is particularly designed as an automatic operator of large parking garages and parking lots to expedite movement into and out of them and to eliminate cashiers and attendants and to perform all of the functions for which such cashiers and attendants are ordinarily required.

My invention requires that garages and lots be so laid out that individual stalls are marked and numbered so that drivers of automobiles may place cars in them, locking the cars and, later, unlocking them and removing them without requiring the services of, or contacting in any way, personnel of the operating company.

My invention includes means whereby delays are completely eliminated as customers arrive to park their automobiles and as they return to drive them away. Automatically operated signs may be used to indicate if and when the facility is filled, and to direct incoming customers to proper lanes leading to vacancies. Illuminated panel boards at pedestrian entrances, at all times, show the amount of charges to be paid and contain means to receive payments and issue receipts. After payment of fees, customers are free to proceed to drive automobiles out of the facility without any other act to be performed.

My invention includes means whereby payment of proper fees is assured through the operation of a signal and annunciator system at the exit, actuated by the mechanism in the panel which responds to the removal of an automobile from its corresponding space and to the amount of money placed in the coin machine, showing the number of the space on the annunciator as it is vacated and lighting a signal light in conjunction with the annunciator if no fee or an insufficient fee is paid.

In addition to the elimination of delays, my invention makes possible large savings in operating costs by removing the need for employed personnel.

The invention possesses other advantages which will be set forth in the following description which, together with the accompanying drawings, form the specification of one form of its application. I do not confine my invention to the specific forms set forth in the drawings and specification as it is capable of many modifications.

Referring to the drawings.

Figure 1:
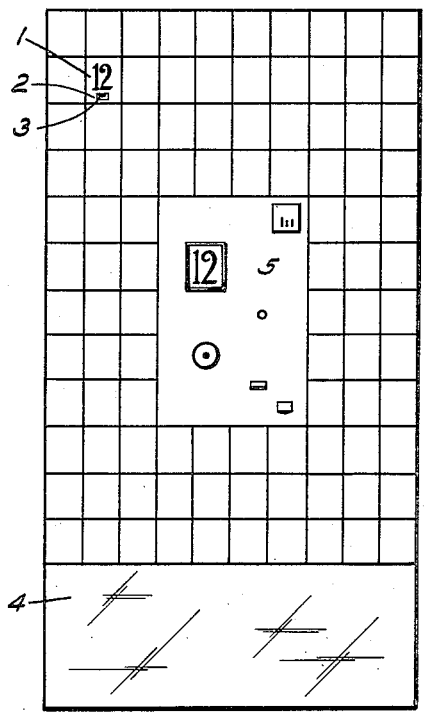
Figure 1 is a view in front elevation of a panel section containing mechanisms for 100 parking spaces and one coin-operated receipt-vending machine. Identical panel sections may be installed adjacent to one another, or otherwise, to increase controls to meet requirements of large facilities.
Figure 2:
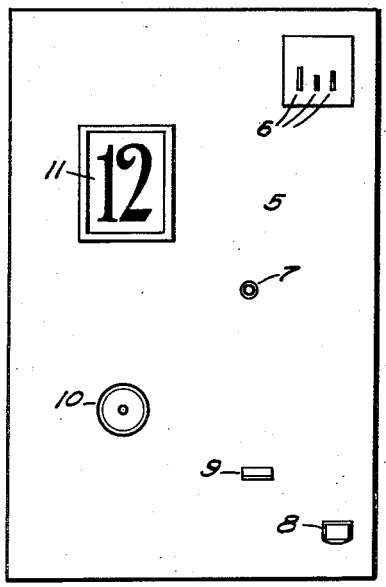
Figure 2 is a front view of the coin-operated receipt-vending machine.
Figure 3:
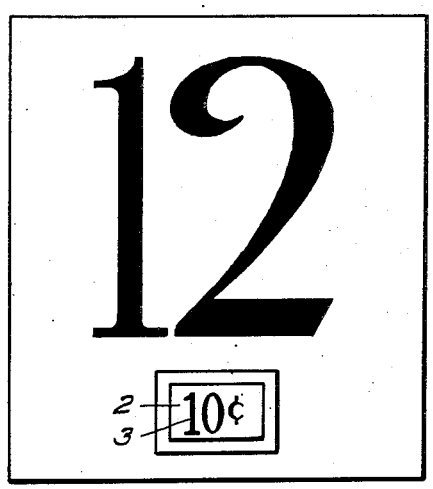
Figure 3 is a front view of the portion of the panel section in front of an individual mechanism controlling parking space number 12.
Figure 5:
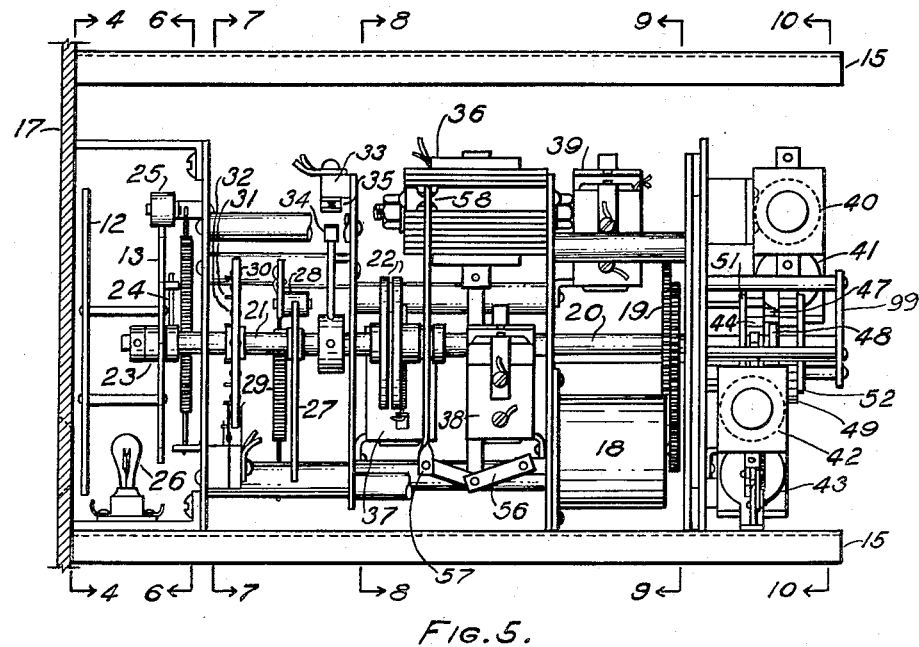
Figure 5 is a side view of one assembly which controls a parking space.

Referring to Figure 1 in detail, 1 designates a rectangular portion of the panel section, also shown in Figure 3, in front of the space control mechanism shown in assembly in Figure 5. Any number of space control mechanisms can be assembled in one section and operated by one selector and one coin operated receipt vending machine, but I have selected 100 as a convenient number per section for the purpose of this specification. Each of the panel spaces 1 is provided with a number, easily visible from a customer's position in front of the panel, corresponding with the number of the parking space it controls. In the lower part of the rectangle is an opening or window 2 through which the amount of the parking charge 3 is visible. The lower part of the panel 4 is blank, the space to the rear being utilized by coin storage cans and foundation work. The central portion of the panel 5, also shown in Figure 2, is the front of the selector shown in Figures 12 and 13 and the coin operated receipt vending machine. Machines for the receipt of coins and the printing of and vending of receipts are well known and are put to many uses. Description of the machine is not necessary here other than to show one of a possible number of arrangements of coin slots 6, actuating push rod 7, coin return 8 and receipt shelf 9. The hand wheel 10 is for customer operation of the selector shown in Figures 12 and 13 and window 11 is an opening in the panel through which the space number appears indicating which space control mechanism is in electrical connection with the coin operated receipt vending machine.

Referring to Figure 3, the number designating the parking space is prominent in comparison with the number indicating the amount of the charge. The window 2, however, is illuminated during the time the corresponding parking space is occupied thereby making the amount of the charge readily discernible. At the moment the space is vacated, the window light is extinguished.

Figure 4:
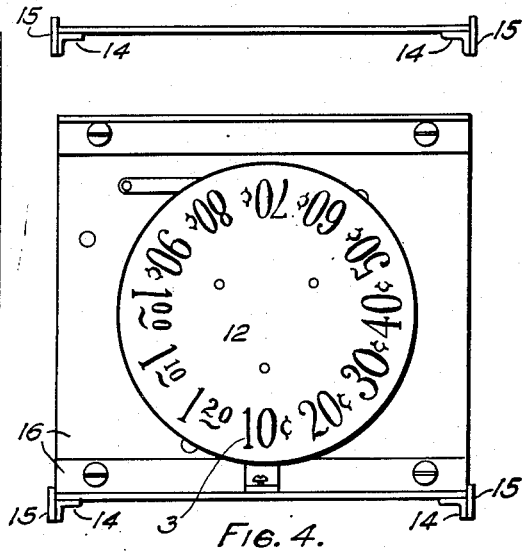
Figure 4 is a sectional view of assembly taken along lines 4—4 of Figure 5.
Figures 6, 7:
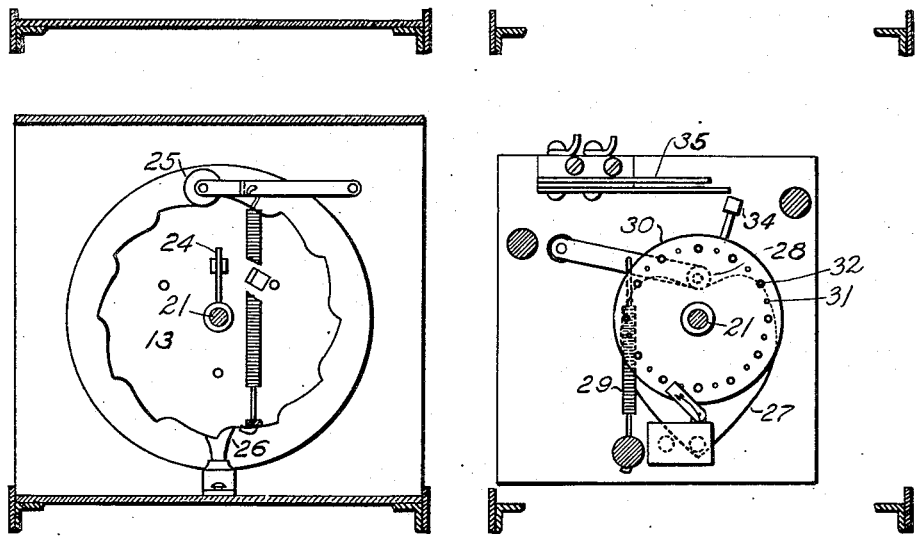
Figure 6 is a sectional view taken along lines 6—6 of Figure 5.
Figure 7 is a sectional view taken along lines 7—7 of Figure 5.

Referring to Figure 4, dial 12 is made of translucent material permitting light to shine through. It is rotated in a clockwise direction making quick changes from one charge to the next in accord with the shape of the jumping cam 13 shown in Figure 6. For the purpose of this specification, the range of charges is from 10 cents to $1.20. Other charges as may be desired can be arranged by substituting the appropriate dials and jumping cams to meet and requirement. Dail 12 is made of translucent material upon which opaque figures are placed. When light from lamp 26 shines through the dial, charge figures are silhouetted and plainly visible. Angles 14 and plates 15 are parts of the supporting framework, constructed as shelves to support the mechanisms in proper positions back of the panel. The chassis of space control mechanism 16 slides into position and rests on shelves 14.

Figure 5 shows a complete space control mechanism in position behind panel 17 resting on its shelf formed by angles 14 and plates 15. Motive power for the operation of that part of the mechanism to the left of line 9—9 is derived from motor 18 which, through a train of gears 19, drives shaft 20 at an extremely low rate of speed. Rotary motion of shaft 20 is transmitted to shaft 21 through clutch 22. Hub 23 is free to rotate on shaft 21 and carries jumping cam 13 and parking charge dial 12. Assembly 23, 13 and 12 is driven by pin 24 which forces roller 25 over the ridges of jumping cam 13. Lamp 26 is lighted at the time an automobile is parked in the controlled space and remains lighted during the entire period of continuous parking. Heart cam 27 is fast to shaft 21 and carries roller 28 which is restrained by spring 29. When clutch 22 becomes disengaged, heart cam 27 brings shaft 21 and its attached parts back to zero position. Charging disk 30 is provided with cams 31 and contactors 32 in numbers and arranged to send impulses to the charging mechanism at proper intervals in accordance with the price schedule established by the management of the facility. Maximum charge holder contact 33 is closed at the end of the first complete rotation of shaft 21 at which time the maximum charge appears in window 2. Closure is made when cam 34 presses against the lower leaf of switch 35. Closing of the switch actuates a relay which cuts out motor 18 but permits solenoid 36 to remain energized thereby holding clutch 22 in engagement and therefore permitting the maximum charge to remain in the window 2 for an indefinite period until the automobile is removed from the controlled parking space. The purpose of relays 37, 38 and 39 will be more readily understood from a subsequent description of the wiring diagram, Figure 14.

Figure 10:
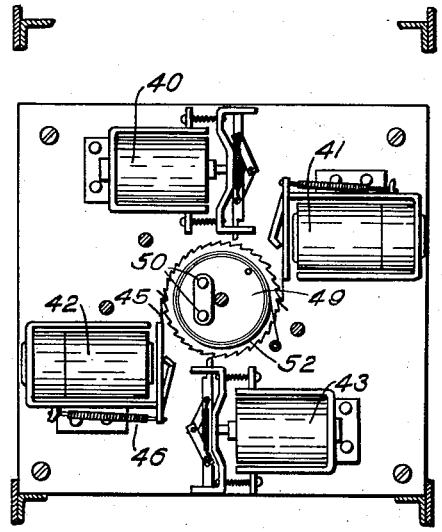
Figure 10 is a sectional view taken along lines 10—10 of Figure 5.
Figure 11:
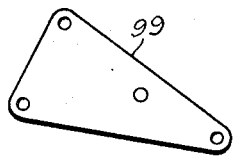
Figure 11 is a view of end plate 99 containing shaft bearing and forming grip for handling space control mechanism assembly when placing it in, or removing it from, shelf of supporting frame work.

Electromagnet 43 responds to impulses from charging disk 30, moving notched wheel 44 one notch at each impulse in a counterclockwise direction, as viewed in Figure 10, against the pressure of springs 45 and 46 of electromagnet 42 which lock and hold wheel in the advanced position. Cam 47 attached to wheel 44 is moved away from the switch leaf 48 which is attached to wheel 49. Wheel 49 is rotated by steps as a result of electrical impulses sent to electromagnet 40. These impulses are sent through the selector, shown in Figures 12 and 13, by the coin machine, one impulse for the deposit of a 5-cent coin, 2 impulses for a dime and 5, for the deposit of a quarter. Terminal posts 50, electrically connected in series to the contact points of switch 48, relay 59, a source of power and common wire 78, form the signal control circuit.

Figure 8:
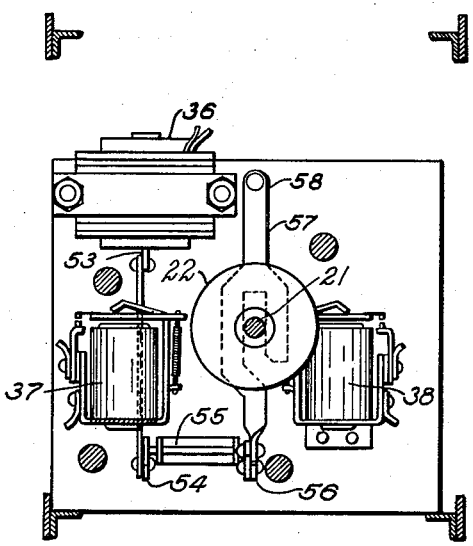
Figure 8 is a sectional view taken along lines 8—8 of Figure 5.

Electromagnet 36, shown in Figures 5 and 8, when energized, lifts armature 53 and link 54. Link 54 is rigidly fastened to shaft 55 and to link 56. As link 54 is raised by the action of electromagnet 36, it also raises link 56 which causes clutch shift lever 57 to move forward sliding one-half of clutch 22 along keyed shaft 20 into frictional engagement with the other half, causing shaft 21 to rotate with shaft 20. Clutch shift lever is pivoted on post at point 58.

Figure 9:
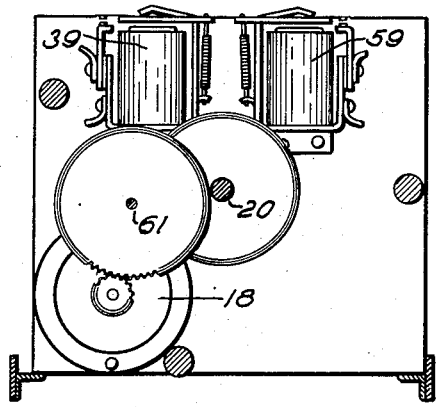
Figure 9 is a sectional view taken along lines 9—9 of Figure 5.

Referring to Figure 9, motor 18 is secured to a backing plate and geared to shaft 20 through a train of gears, including intermediate gears rotating about shaft 61.

Figure 12:
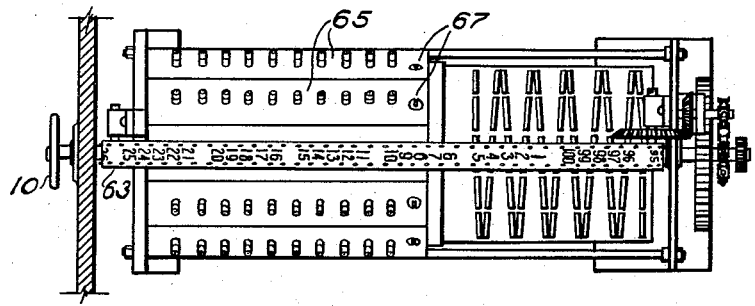
Figure 12 is a top plan view of the selector which, operated by the customer, connects the coin operated receipt vending machine electrically with one of the 100 control mechanisms.
Figure 13:
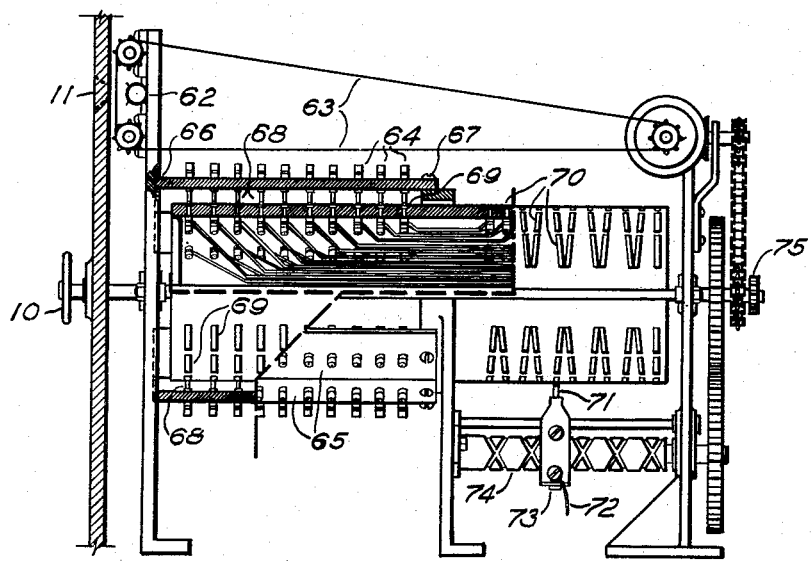
Figure 13 is a side view, with two cut-away sections, of the selector.

Referring to Figures 12 and 13, the mechanism shown is the selector which supplies the means to connect electrically any one of the 100 space control mechanisms in the panel division with the coin operated receipt vending machine. Handle 10 is turned by the customer until the number of the parking space in which he has parked his car appears in window 11. The window is illuminated by light 62. Opaque numbers are carried on an endless translucent belt 63. Positive synchronization of belt position and circuit contacts is maintained by chain and cog wheel or gear drives. Wires, one from each of the 100 space control mechanisms, are attached to terminal posts 64 in groups of 10 each to the 10 segment boards 65 which are placed in receiving groove 66 and fastened in position by a single screw 67. Each terminal post 64 is provided with a sliding spring contact 68. Contact 68 makes an electrical connection with 10 separate contact areas 69 contained in the revolving drum as it is rotated. Contact areas 69 are connected electrically to contact areas 70 on the uncovered portion of the drum. Electrical connection with contact areas 70 is made with sliding spring contact 71 and through wire 72 to the coin operated receipt vending machine. Sliding spring contact 71 and its carriage is moved from one end of its path to the other by guide 73 whose inner end follows the groove of the endless spiral in shaft 74. This design permits a great number of circuits to be completed without increasing the over-all size of the device and avoids possible damage to the mechanism by allowing handle 10 to be rotated in either direction without limits.

Receipts will be printed at the time of each transaction. They will show the name of the facility, date, amount paid and the space number. Gear 75 is provided on the selector shaft to which the space numbering mechanism of the machine will be attached, other printed items being set entirely by the coin operated receipt vending machine.

Figure 14:
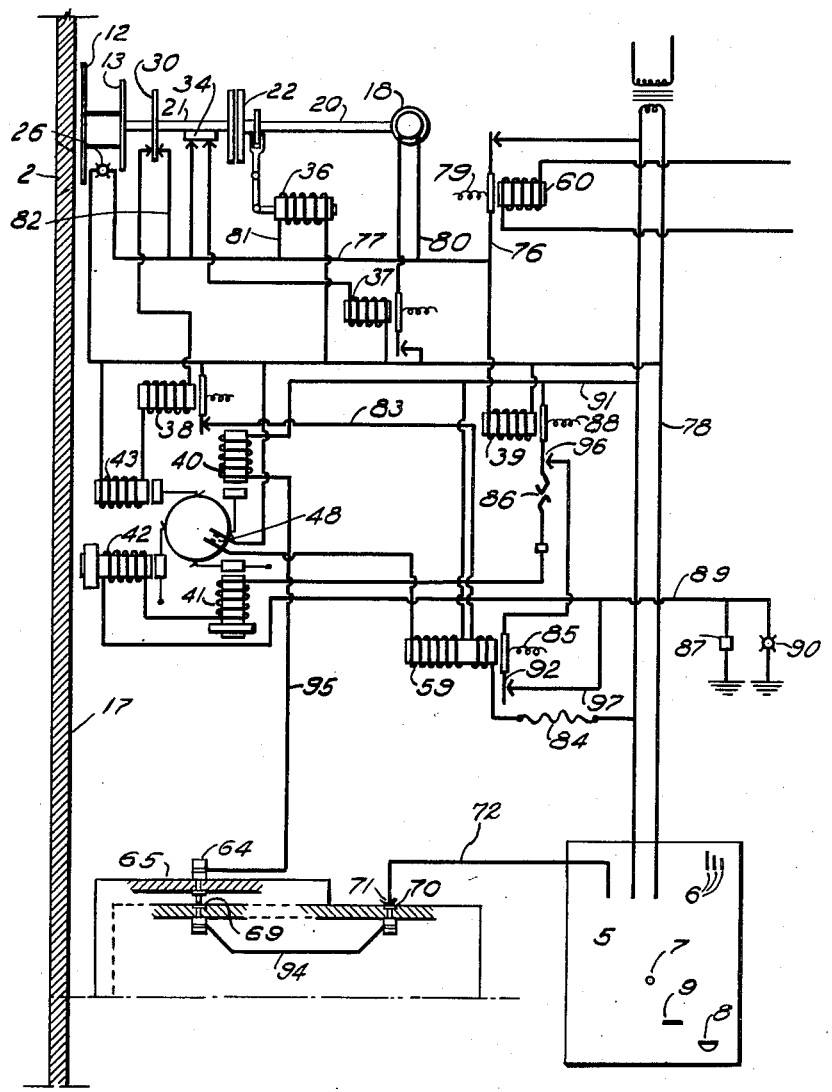
Figure 14 is a wiring diagram showing connections between the automobile detector, the space control mechanism, the selector and the coin operated receipt vending machine.

The wiring diagram, Figure 14, shows the circuits necessary for the operation of one space control mechanism and connections with the automobile detector circuit, the selector circuit and coin operated receipt vending machine. Automobile detection may be accomplished by the use of a pressure mat, pneumatic devices, mechanical devices or with magnetic apparati with suitable relays and vacuum tubes. When detection is made by the use of a pressure mat, pneumatic device or other mechanical devices, the design of such means will provide for the closure of circuit through wire 76 keeping circuit closed until the automobile actuating the detector is removed. Operating current may then be used in the detector circuit, thereby eliminating the need for relay 60, electronic relays and other equipment needed when magnetic detection is employed. The functions described hereafter to be performed by relay 60 will, with mechanical detection, be performed by the detector switch. If magnetic apparati are used, the armature of relay 60, when attracted, will close the circuit leading from a source of power through wire 76 to the space control mechanism assembly. Switch of relay 60 will remain closed for the entire duration of parking. Current will then flow through wire 77, through light 26 and back to common wire 78. Upon removal of the automobile, armature of relay 60 is pulled away by action of spring 79 extinguishing light 26.

Current will flow through wire 80, when relay 60 is energized, to self starting motor 18, through armature of relay 37 and back to common wire 78. At the same time, current will flow through wire 81, energizing electromagnet 36, attracting its armature and shifting clutch 22 into engagement, rotating shaft 21.

As the mechanism reaches maximum position, with maximum charge appearing through window 2, cutout 34 closes switch 35 which causes current to flow through relay 37 attracting its armature and opening motor circuit causing motor 18 to stop but allowing clutch 22 to remain engaged thereby holding mechanism at maximum charge position.

An impulse of current will flow through wire 82 when contact is made through charging disk 30, energizing relays 38 and electromagnet 43 and back to common wire 78. The impulse will cause electromagnet 43 to move charging wheel 44 one notch forward. As charging disk 30 is rotated, additional impulses will cause charging wheel 44 to move a corresponding number of notches forward until the maximum position is obtained or until the parking space is vacated. Impulses through wire 82 passing through relay 38 interrupt, momentarily, the current through wire 83 which is connected in series with the high resistance winding of relay 59 and resistance 84 allowing spring 85 to close the signal circuit at this point. Since the current through wire 83 is strong enough only to hold armature of relay 59 in attracted position once it has been drawn by stronger magnetic action from heavier current through the low resistance winding, the returning current after the closure of switch of relay 38 will have no effect upon armature of relay 59 and its switch will remain closed.

Current through wire 76 will flow through relay 39 attracting its armature, opening switch 96 and holding it open during the entire period of parking. In passing from closed to open position and, again, in passing from open to closed position, spring contact points 86 are brought into momentary contact with each other. However, one side of each of the points is insulated so that as they are contacted on opening of switch 96, no current will flow and annunciator 87 will not be affected. When the automobile is unparked, current through relay 39 is cut off, the action of spring 88 closes switch 96 and contacts 86 are momentarily brought together, sending an impulse through electromagnets 41 and 42 attracting armatures of electromagnets 41 and 42 unlocking wheels 44 and 49 allowing them to return to starting position through the action of coil springs 51 and 52, and through wire 89 causing annunciator drop 87 to fall and light 90 to flash. With switches 96 and 92 closed, current will flow through wire 91, armature of relay 39, switch 96, to armature of relay 59 and through wires 97 and 89, through annunciator 87 and light 90. If switch of relay 59 is held open, light 90 will not stay on, flashing only as annunciator drop 87 falls as a result of flash contact of points 86.

Impulses in number proportional to the amount of money deposited in coin slots 6 will flow from wire 91 through relay 40, wires 95, 94 and 93 through coin machine to common wire 78. Armature of electromagnet 40 will be attracted a number of times equal to the number of impulses from the coin machine, moving notched wheel 49 around its axis bringing switch leaves 48 together when a sufficient number of impulses have been received. Closure of switch 48 causes current to flow from wire 91 through low resistance winding of electromagnet 59, switch 48, and to common wire 78. Current through low resistance winding of electromagnet 59 attracts its armature against tension of spring 85, allowing weaker current through high resistance winding to hold armature in attracted position after current through low resistance winding has ceased to flow.

The operation of my parking garage and parking lot automatic operator in the form as herein illustrated is as follows.

Incoming customer parks car in any available space, taking with him a slip of paper from a box at his stall upon which the number of the space appears. Returning to the facility, customer enters at the pedestrian entrance, reads the amount of the charge appearing in the illuminated window 2 corresponding to his space number, turns handle 10 bringing his space number to show in illuminated window 11, deposits nickels, dimes and quarters in the amount required, pushes plunger 7, takes receipt from shelf 9 and drives his car from the garage.

The mechanisms, from start to finish of a parking act, operate as follows. Placing a car under, over or against a suitable means of detection, closes detector switch or switch at relay 60 if magnetic detection is employed. This closes a number of circuits opening switch 96, starting motor 18, engaging clutch 22 and lighting lamp 26. Since normally, current flows through resistance 84 and wire 83 holding armature of electromagnet 59 in open switch position, and since switch of relay 38 does not break this current until the first charge is made at disk 30, cars may be driven into and out of parking stalls during maneuvering without setting annunciator and light 90 to non-clearance indications. Should a car remain 10 minutes in a parking stall, it is assumed that such car is parked, therefore, the first contact to be made on disk 30 is placed so that first charge is registered 10 minutes after mechanism is placed in operation. When this and subsequent charges are made by subsequent impulses from disk 30, charging wheel is advanced cumulatively a corresponding number of notches and switch of relay 59 is closed because of the break in current in the high resistance winding of relay 59. This current is too weak to attract the armature from closed switch position but strong enough to hold it in attracted position after attraction by current through the low resistance winding. Should switch be opened by the deposit of coins only in the amount at the moment required, and should customer's car be left for an extended period after such deposit, the advance of charging disk 30 past the next charging contact will again close the switch of relay 59 allowing annunciator and light 90 to go into action should the car be removed without full payment. If, however, the required additional coins are deposited, the payment wheel 49 will be advanced to make up for the advance of charging wheel and will close switch 48 and again open switch of relay 59, thereby preventing signal 90 from showing on departure of the vehicle.

The angular positions of charging contacts on disk 30 and figures on dial 12 are such as to provide the required lag between appearance of a given charge in window 2 and the next impulse from the charging disk 30 to enable customers after making payment to remove their automobiles before the mechanism sets signal 90 to show on their departure. This lag would ordinarily be about 5 degrees corresponding to approximately 10 minutes which should be ample to permit customers to reach cars from the panel location and to remove them from their berths.

The annunciator board may be of any of the standard types containing a light and drop relay for each parking space. The drop should show the number of its corresponding parking space. The board should be located so as to be readily visible from a standing position next to the left side of a car in the exit lane of the facility as well as from an observation point in a booth or shelter where an observer may be stationed. Each car leaving its berth will cause its corresponding relay drop to fall showing the berth number. If the fee has not been paid, the drop will fall and the light signal 90 will go no and remain on. An observer on duty, seeing the light go on, will stop outgoing cars to check receipts. From a comparison of receipts with the board, the observer can detect the driver who failed to pay the proper fee, who can be handled and dealt with in accordance with the policy of management. Relay drops are reset by hand. Signal lights remain on until spaces are reoccupied. The number of lights on at any time furnishes an indication of the number of faulty parking acts and consequently the need for maintaining an observer at the exit and at what times such an observer might be of most value.

I claim:

1. Parking garage operating apparatus comprising a parking berth; an automobile-operated switch in said parking berth to be closed by an automobile parked therein and to be opened by the removal of said automobile; a parking berth control unit including a charge indicator displaying amount off parking fee payable; means for providing the power to drive said parking berth control unit in circuit with said automobile-operated switch; said parking berth control unit being so constructed to start at minimum charge and to continue to progressively greater charges as long as said automobile-operated switch is held in contact position by a parked automobile until maximum charge is indicated; means to return said parking berth control unit to said minimum charge position in response to the opening of said automobile-operated switch means to hold said parking berth control unit in maximum charge position after said maximum charge has been reached so long thereafter as said automobile-operated switch continues to be held in contact position; means connectable in circuit with said automobile-operated switch to produce a light to illuminate said charge indicator so long as said automobile-operated switch is held in contact position; electrical pulse transmitting means connected with said charge indicator operable to move a charging wheel into successive positions, with each of said positions corresponding to a pre-determined parking fee; a coin-operated receipt-vending machine adapted to transmit electrical pulses in number equal to the smallest number of coins equivalent in value to the amount of money deposited; selector switch means to connect said coin-operated receipt-vending machine in pulse transmitting relation with any one of a plurality of said parking berth control units; a payment wheel mounted in juxtaposition to said charging wheel; means to move said payment wheel into successive positions each position being advanced from zero position in proportion to the number of electrical pulses received from said coin-operated receipt-vending machine; means whereby an electrical circuit is closed when the advance of said payment wheel equals or is greater than the advance of said charging wheel; a signal located near the path of said automobile as it leaves said parking berth; an electrical circuit connecting in series said signal, two relay-operated switches, and a source of power; means to move the first of said relay-operated switches to closed position after said charging wheel is initially moved by said pulse transmitting means, and the second of said relay-operated switches being held in open position so long as said automobile-operated switch is held in closed position by a parked automobile, the second of said relay-operated switches closing upon the departure of said automobile closing said circuit and actuating said signal.

2. Parking garage equipment comprising a parking garage in which a plurality of parking spaces are marked and numbered; a plurality of electrical vehicle-actuated switches arranged in said plurality of parking spaces in electrical circuit with a plurality of parking fee controllers; a panel in which said plurality of parking fee controllers is contained and upon which each controller space is numbered to correspond with the number of parking space it controls; a coin-operated mechanism electrically connectable with any one of the said plurality of parking space controllers; a selector switch operable manually including means to connect electrically said coin-operated mechanism with any one of said plurality of parking space controllers; said selector switch including a rotatable member with a plurality of surface contact areas with which a plurality of circuits connecting said plurality of parking fee controllers is in electrical connection; a like plurality of surface contact areas electrically connected with said plurality of contact areas; a sliding contactor guided through an endless spiral on a shaft driven by said rotatable member through means to maintain a fixed relationship between said rotatable member and said shaft; said contactor contacting, one at a time, each of said like plurality of surface contact areas, said sliding contactor being also connected electrically with said coin-operated mechanism thus completing electrical connections between said coin-operated mechanism and, one at a time, each of said plurality of parking fee controllers; an endless belt, upon which are numbers to correspond with the numbers designating said plurality of parking spaces and said plurality of parking fee controllers, driven by means to maintain a fixed relationship between said belt position, said rotatable member, and said sliding contactor, said numbers being visibly displayed, one at a time, in a window of said panel to indicate for any given position of said rotatable member which of said plurality of parking fee controllers is in electrical circuit with said coin-operated mechanism; accounting mechanisms contained in said plurality of parking fee controllers including fee charge accumulators consisting of rotatable members angularly moved by steps, each said step resulting from electromagnetic action of an electrical impulse from a charging disk mounted on shaft means driven by a timing motor of a parking fee controller, said charging disk containing contact members arranged in accordance with price schedules established for said parking garage, said rotatable members having attached thereto switch closing means and being adapted to be advanced angularly from payment accumulators at each said electrical impulse in proportion to the parking fee charge increment for which said impulse is timed; said payment accumulators consisting of rotatable members rotatable in planes parallel to the planes of rotation of the rotatable members of said charge accumulators and mounted in close proximity to said charge accumulators.

3. Parking garage operating mechanism comprising a plurality of automobile parking stalls, an accumulator type fee indicator associated with each stall, means operable in response to the presence in any stall of an automobile therein to drive the fee indicator associated therewith forwardly, a coin receiving machine, selector means to relate said machine with any given fee indicator, warning means associated with said stalls and fee indicators operable in response to the departure of an automobile from a stall and to the existence of a fee-indicated condition on the indicator associated with said stall to actuate a signal, and means to render said warning means for a given stall inoperable when the fee indicator therefor is related to said coin receiving machine by said selector means and the fee set forth on said indicator has been deposited into said machine.

4. Parking garage operating apparatus comprising a parking garage containing a plurality of parking spaces; a vehicle-actuated switch mechanism arranged in each of said parking spaces; a panel board centrally located in or near the pedestrian entrance of said parking garage; a plurality of space control mechanisms mounted in said panel board, said panel board displaying a different character to identify each of said space control mechanisms with the parking space each said space control mechanism controls; means in circuit with said vehicle-actuated switch mechanisms to cause a separate light to illuminate each of said parking fee indicators during the period said vehicle-actuated switch mechanisms are acted upon by parked vehicles; individual motor means in circuit with said vehicle-actuated switch mechanisms to drive individually each said space control mechanism, means to provide for quick change of said parking fee indicators from one parking fee to another including jumping cams, rollers, levers, springs and free bearings on drive shafts; means including eccentrically-mounted cams to return said space control mechanisms to starting position when said vehicle-actuated switch mechanisms cease to be acted upon by parked vehicles; means to stop individually rotary motion of said individual motor means when maximum parking fee is indicated including means to hold said parking fee indicators at maximum position so long as said vehicle-actuated switch mechanisms continue to be acted upon by parked vehicles; charging disks mounted on shafts of said space control mechanism containing switch contact means to close circuits at each change of parking fee, said circuits simultaneously actuating relays closing signal circuits and advancing charging mechanisms; said charging mechanisms including rotatable members carrying switch contact means, said rotatable members being angularly moved in steps, each said step resulting from electromagnetic action of current through circuits closed by said charging disks; clutch means drivingly connecting motor-driven shafts with shafts upon which are mounted said parking fee indicators, said charging disks and said means including said eccentrically-mounted cams to return said space control mechanisms to starting position; said clutch means being actuated by electromagnets connected in series with said vehicle-actuated switch mechanisms; a manually actuated coin-operated receipt-vending device adapted to serve said plurality of space control mechanisms, to receive coins, and to send electrical impulses in numbers equal to the number of smallest coins equivalent to the amount paid, and when manually actuated, to print and vend receipts showing space identifying character, amount paid and date; a variable switch apparatus rotatable in either clockwise or counter-clockwise direction by manual manipulation of handle mounted in said panel board, said variable switch apparatus being adapted to selectively connect electrically said coin-operated receipt-vending device with any one of said plurality of space control mechanisms; means to show, at any time, by appropriate characters visible through said panel board and illuminated at all times, which one of said plurality of space control mechanisms is in electrical connection with said coin-operated receipt-vending device; means to receive said electrical impulses from said coin-operated receipt-vending device at said space control mechanisms and by electromagnetic action to convert said electrical impulses into angular movements by steps of payment mechanisms, said payment mechanisms including rotatable members carrying switch contact means; said switch contact means being advanced by steps toward prior advanced switch contact means carried by said charging mechanisms until sufficient coins have been deposited to equal or exceed the charge, at which time electrical contact is made between said switch contact means to close a circuit; said circuit containing a relay whose armature is attracted thereby opening a signal circuit; a plurality of signal lamps mounted in an annunciator board visible from a point near the exit of said parking garage, said signal lamps being in circuit with a source of power, each said circuit containing two switches, one switch being held open so long as said vehicle-actuated switch mechanism remains in closed position and being closed upon the departure of said vehicle actuating said vehicle-actuated switch mechanism, the other switch being closed at all times except when opened by the action of an electromagnet energized by current flowing through said switch contact means carried by said charging mechanism and by said payment mechanism, thus causing said signal lamps to be actuated when a vehicle ceases to actuate said vehicle-actuated switch mechanism, provided said other switch has not been opened by the deposit of the required amount of parking fee the opening of said other switch in response to payment of the proper parking fee preventing said signal lamp from being actuated, thereby giving clearance to departure of said vehicle.

5. A parking lot operator comprising a parking area; a mechanical-electrical automobile-actuated switch erected in said parking area to be acted upon by an automobile parked in said parking area; a parking fee meter electrically connected with said parking area switch including means to visibly show amount of parking fee due and payable at any and all times during period said mechanical-electrical automobile-actuated switch shall be acted upon by said automobile parked in said parking area; means to receive said parking fee due and payable and to issue printed receipt therefor; a manually operated circuit selector including means to connect electrically said means to receive said parking fee with said parking fee meter; apparatus actuated by electrical impulses from said parking fee meter and from said means to receive said parking fee including means to control a signal circuit keeping said signal circuit open if said parking fee due and payable is paid or keeping said signal circuit closed if said parking fee due and payable is not paid; said signal circuit actuating an annunciator and signal identified by appropriate character with said parking fee meter and said parking area, said annunciator and signal being located at a point readily visible from an observation booth located at the exit of said parking area.

6. A serve-self parking apparatus comprising a parking facility containing parking stalls; vehicle-actuated switches arranged in said parking stalls to be actuated by vehicles parked in said parking stalls; parking fee mechanisms in electrical circuit with said vehicle-actuated switches including visible means of displaying the amount of parking fee accumulated at any time during the period said vehicle-actuated switches are being acted upon; a multiple circuit contactor including means to complete any one of a multiple of circuits between a coin machine and said parking fee mechanisms including means to select any one of said circuits by manual means and by visible display of an identifying character to select the circuit which is desired, said character being also displayed at parking fee mechanism with which it makes electrical connection; annunciators and signals in electrical circuit with said parking fee mechanisms, said annunciators and signals being located at the exit of said parking facility; means to actuate an annunciator to reveal by character identification any parking stall vacated the instant the vehicle-actuated switch associated therewith ceases to be acted upon; means operable to actuate a signal to reveal by character identification which parking stall is vacated the instant the vehicle-actuated switch associated therewith ceases to be acted upon; means operable in response to payment of the indicated fee to prevent the operation of said signal actuating means; means to synchronize said multiple circuit contactor and said coin machine to cause said coin machine to print identifying character designating parking stall, annunciator, signal and parking fee mechanism involved in one parking transaction on receipt issued by said coin machine upon the payment of parking fee and manual actuation.

References Cited in the file of this patent

UNITED STATES PATENTS 2,015,607  Shinn _____ Sept. 24, 1935